United States Patent
Shimizu

[11] Patent Number: 5,227,642
[45] Date of Patent: Jul. 13, 1993

[54] APPARATUS FOR OPTICALLY READING AND DISCRIMINATING SYMBOLS OR CHARACTERS REPRESENTED BY INDENTATIONS FORMED ON THE SURFACE OF A SAMPLE

[75] Inventor: Shigeaki Shimizu, Nirasaki, Japan
[73] Assignee: Tokyo Electron Yamanashi Limited, Nirasaki, Japan
[21] Appl. No.: 814,795
[22] Filed: Dec. 31, 1991

[30] Foreign Application Priority Data

Feb. 25, 1991 [JP] Japan .................. 3-50150
Jul. 18, 1991 [JP] Japan .................. 3-202299

[51] Int. Cl.⁵ .............................. G06K 7/10
[52] U.S. Cl. .................. 250/566; 250/237 R
[58] Field of Search ......... 250/216, 208.1, 237 R, 250/568, 566, 578.1, 555, 548; 382/1, 8, 65, 66, 67

[56] References Cited

U.S. PATENT DOCUMENTS

| | | | |
|---|---|---|---|
| 4,262,208 | 4/1981 | Suzki et al. | 250/548 |
| 4,614,430 | 9/1986 | Hara et al. | 382/8 |
| 4,634,876 | 1/1987 | Ayata | 250/548 |
| 4,694,186 | 9/1987 | Onoda et al. | 250/548 |
| 4,697,087 | 7/1987 | Wu | 250/548 |
| 4,798,948 | 1/1989 | Neumann et al. | 250/201.3 |
| 4,965,842 | 10/1990 | Crossley et al. | 382/1 |
| 5,038,048 | 8/1991 | Maeda et al. | 250/572 |

Primary Examiner—David C. Nelms
Assistant Examiner—John R. Lee
Attorney, Agent, or Firm—Oblon, Spivak, McClelland, Maier & Neustadt

[57] ABSTRACT

A symbol/character discrimination apparatus having a dark-field light source for applying light beams at a predetermined angle of incidence to the surface of a sample on which symbols and/or characters are formed in an indentation pattern, a CCD camera for detecting reflected light beams from the sample surface, and a condensing lens for illumination, diaphragm, and objective optical lens for detection, arranged between the CCD camera and the sample and having a common optical axis. The condensing lens is located between the light source and the sample to condense the light beams from the light source on the surface of the sample and guides the reflected light beams from the sample to the diaphragm. The diaphragm intercepts regularly reflected light beams among the reflected light beams and guides some of the irregularly reflected light beams to the objective optical lens for detection. The objective optical lens guides some of the irregularly reflected light beams to the CCD camera.

11 Claims, 7 Drawing Sheets

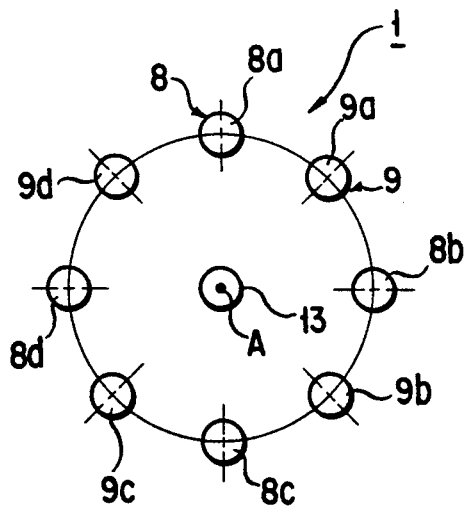
F I G. 4
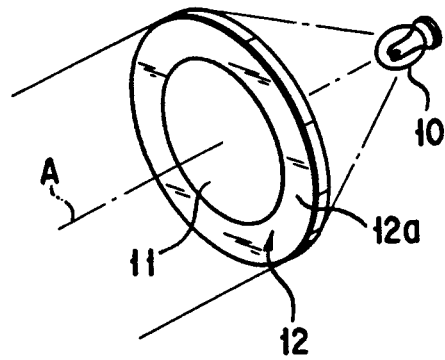
F I G. 7

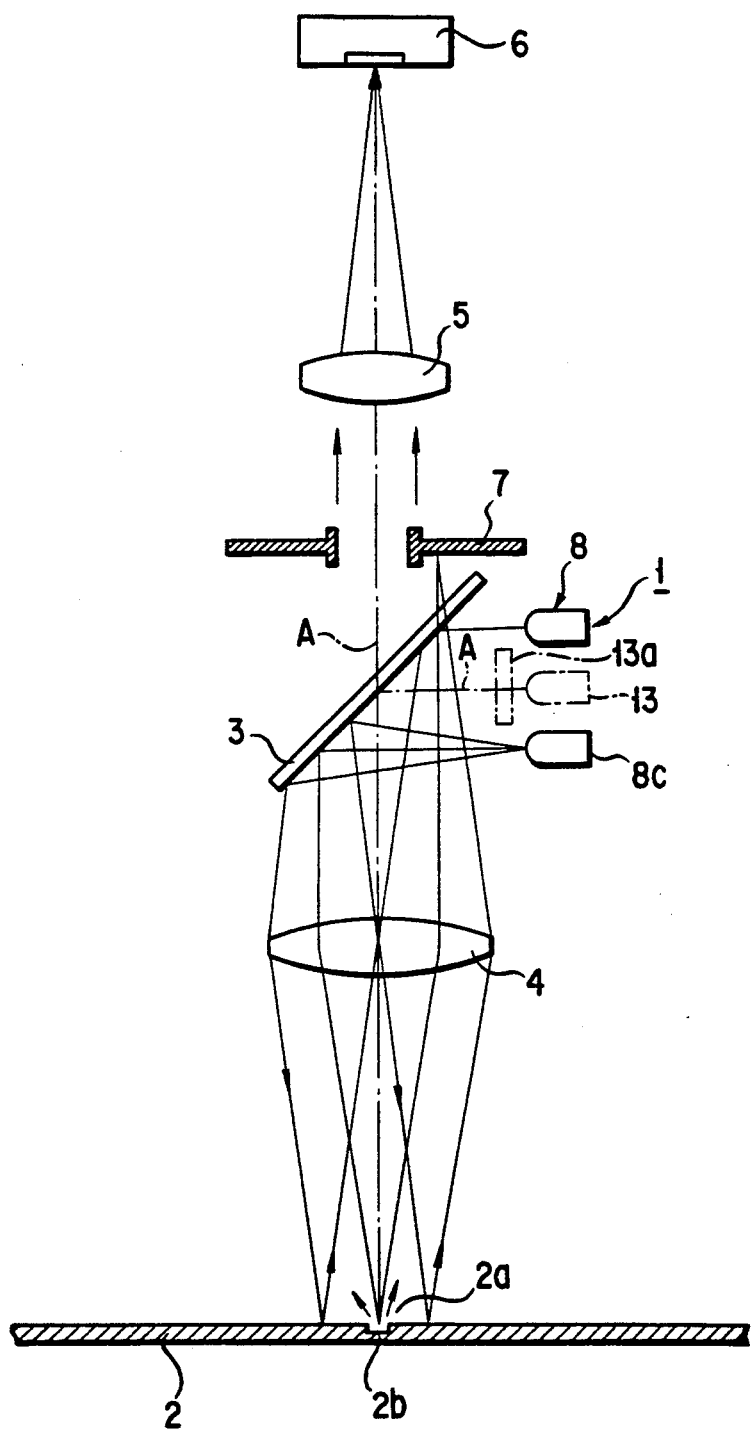
F I G. 3

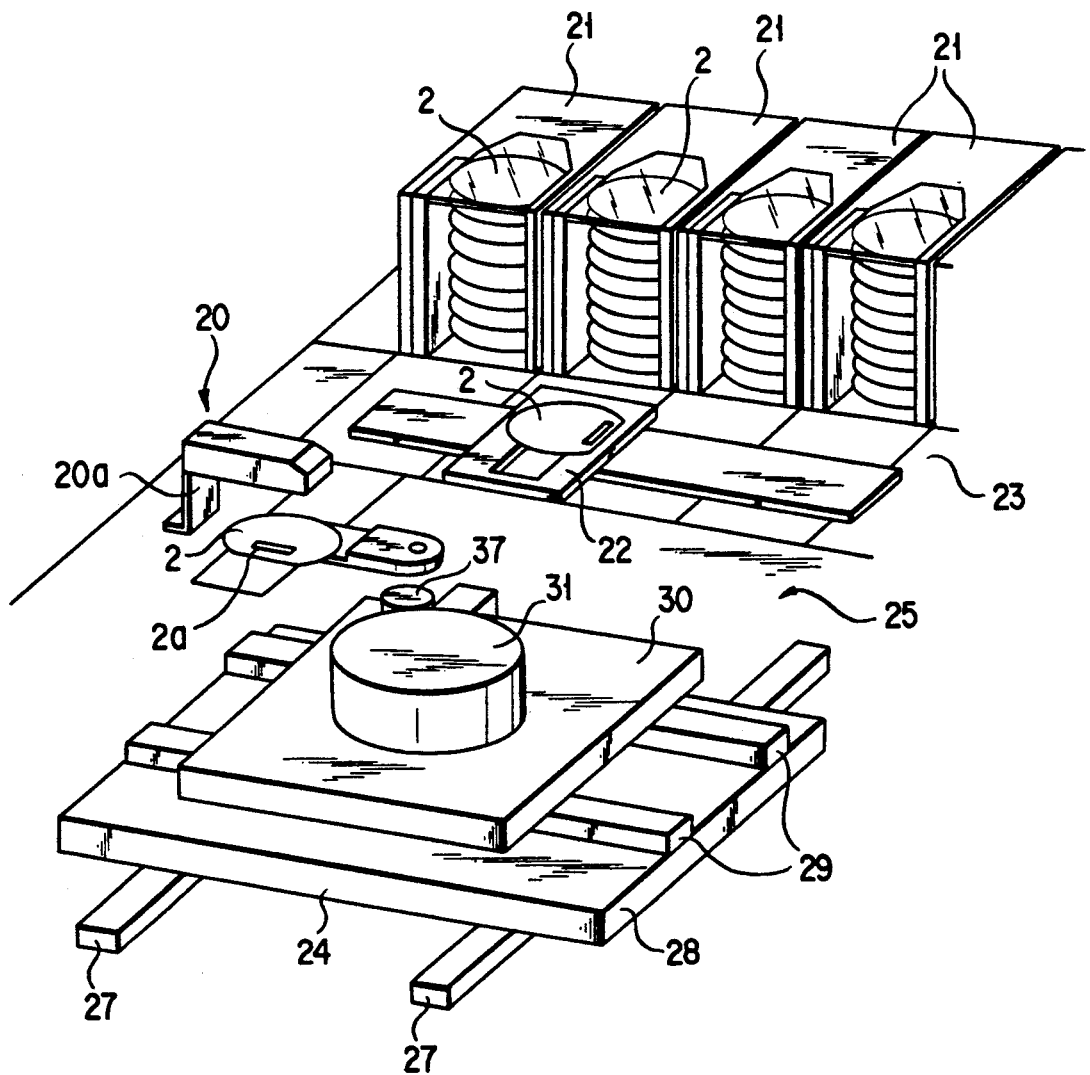
F I G. 9

APPARATUS FOR OPTICALLY READING AND DISCRIMINATING SYMBOLS OR CHARACTERS REPRESENTED BY INDENTATIONS FORMED ON THE SURFACE OF A SAMPLE

BACKGROUND OF THE INVENTION

1. Field of the Invention

The present invention relates to a discrimination apparatus for discriminating symbols and/or characters affixed to samples, and more particularly, to a symbol/character discrimination apparatus for samples for discriminating identification symbols, characters, etc. which are formed in indentation patterns on the surface of a sample, such as a semiconductor wafer.

2. Description of the Related Art

Generally, in a process for manufacturing semiconductor devices on a semiconductor wafer (hereinafter referred to simply as wafer), a pattern such as Arabic numerals or bar codes is affixed to a predetermined position on the wafer in order to facilitate discrimination or management of the type of the wafer, manufacturing process, etc. A measuring light beam is applied to the pattern, and a reflected light beam from the patterns is landed on image sensing means, such as a CCD camera. The pattern, thus recognized as images, is compared with the previously stored patterns for identification, so that the wafer quality and process management can be checked as the semiconductor devices and manufactured.

The aforesaid patterns include, for example, engraving characters or dot characters, cut continuously or in dots with use of a laser beam, and characters formed of combinations of fine strips extending at 45° to an incident laser beam. Among these patterns, the cut patterns vary considerably in cut depth according to purposes, including ones as deep as several micrometers to more than ten micrometers and ones as shallow as 1 to 2 $\mu$m. The deep patterns with the cut depth of several micrometers to more than ten micrometers are subjected to a light-field measurement such that a groove portion can be recognized as a dark image contrasted by a light picture, by applying a light beam from a light source to the cutting surface of the wafer substantially at right angles thereto (light-field irradiation). This is done because reflected light beams from the groove scatter due to the irregularity of the bottom surface of the groove, and ones from the other surface region, which is specular, are regular and more abundant. If the cut groove is as shallow as 1 to 2 $\mu$m, however, there is only a small difference between the amount of the scattered light beams from the bottom surface of the groove and that of the reflected light beams from the specular surface of the wafer. Accordingly, in this case, the groove portion cannot be definitely discriminated from the specular surface region.

Conventionally, therefore, a dark-field measurement is conducted in the following manner. As shown in FIG. 1, a light beam from a light source a is diagonally applied to the surface of a wafer b at a predetermined incidence angle $\theta$. Then, a groove d is recognized as a region brighter than its surrounding region in a manner such that a reflected light beam in a position deviated at a small angle $\theta_1$ from an optical axis c just opposite to that of the light source a is received, and that regularly reflected light beams from the surrounding region are not received. For securer prevention of the reception of the regularly reflected light beams, in this case, a screen plate e is disposed between the light source a and the reception side.

In the conventional discrimination apparatus of this type, however, the light source a is a single light beam emitting structure. Therefore, the light beam cannot be uniformly applied to the sample surface in the dark-field measurement, and it is difficult to discriminate the groove portion definitely from the specular portion outside the groove. Since an intricate optical system, including a lens and a mirror, is arranged between the light source a and image sensing means, moreover, the apparatus has a large size as well as a complicated construction, so that space cannot be effectively utilized. It is not very practical, therefore, to incorporate the discrimination apparatus of this type in a wafer inspection apparatus, such as a probe apparatus.

SUMMARY OF THE INVENTION

The object of the present invention is to provide a symbol/character discrimination apparatus for samples, in which symbols and/or characters can be definitely discriminated by uniformly applying light beams to the surface of a sample in a dark-field measurement, and space can be effectively utilized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2 and 3 show a symbol/character discrimination apparatus according to an embodiment of the present invention, in which FIG. 2 is a schematic perspective view, and FIG. 3 is a diagram showing optical paths;

FIG. 4 is a diagram showing a layout of light emitting elements of a light source of the apparatus according to the embodiment;

FIG. 7 is a side view showing a modification of the light source;

FIGS. 8 and 9 show a probe apparatus incorporating the symbol/character discrimination apparatus of the invention, in which FIG. 8 is a general perspective view and FIG. 9 is a partial enlarged view;

DETAILED DESCRIPTION OF THE PREFERRED EMBODIMENTS

An embodiment of the present invention will be now be described in detail with reference to the accompanying drawings.

Figure 1:
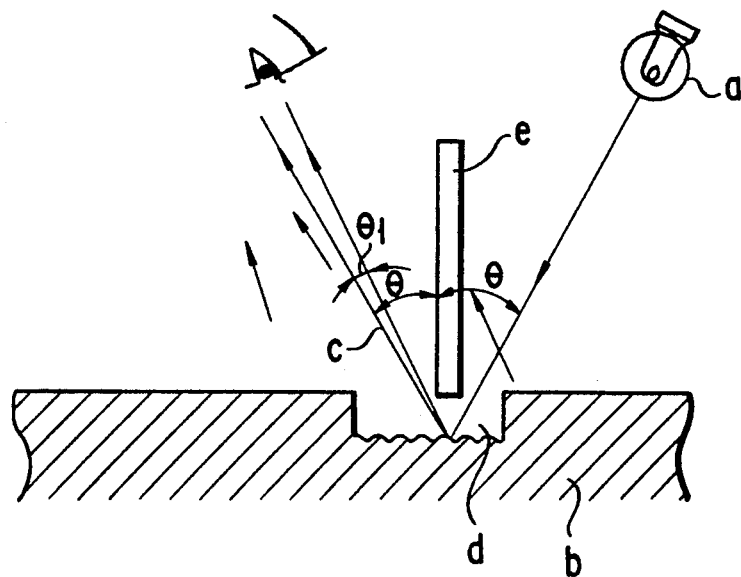
FIG. 1 is a diagram for illustrating the principle of conventional symbol/character discrimination.
Figure 2:
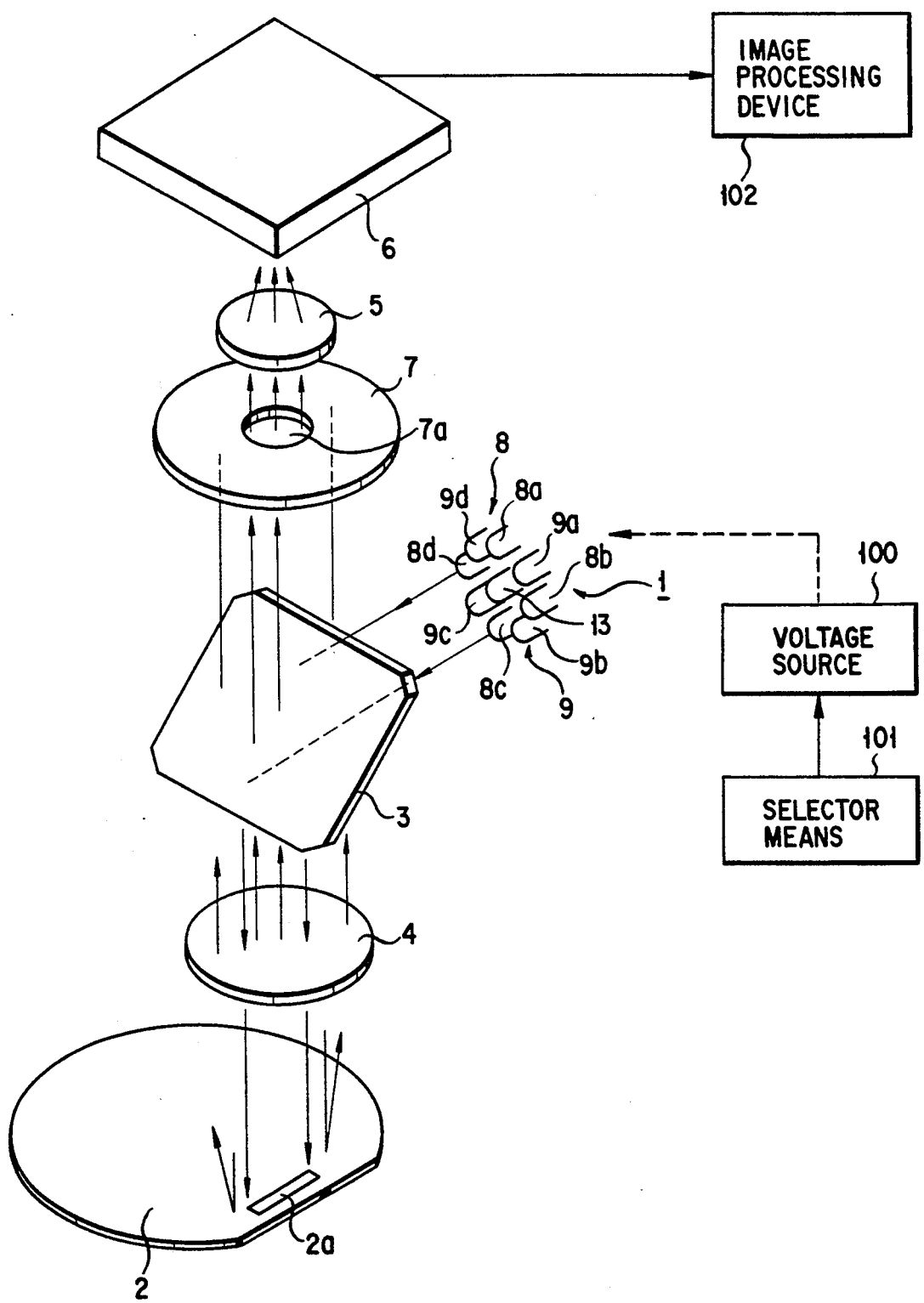

FIG. 2 is a schematic perspective view of a symbol/character discrimination apparatus according to the embodiment of the present invention, and FIG. 3 is a diagram schematically showing a configuration of the apparatus.

This symbol/character discrimination apparatus is composed mainly of a light source assembly 1, a half-mirror 3 for use as a half-transmitting reflector, a condensing lens 4 for illumination, an objective lens 5 for detection, and a CCD camera 6 for use as image sensing means. The mirror 3 guides a light beam or beams from the assembly 1 onto a discrimination region 2a cut in a wafer 2 as a sample, and transmits reflected light beams from the wafer. The condensing lens 4 is disposed between the half-mirror 3 and the wafer 2, while the objective lens 5 is located above the mirror 3 so as to be on the same optical axis A as the lens 4. The camera 6 is situated in the focus position of the objective lens 5.

A diaphragm 7, which is formed of a plate having a circular opening 7a in the center, is disposed between the half-mirror 3 and the objective lens 5, and the aforesaid optical axis passes through the center of the opening 7a. The diaphragm 7 intercepts light reflected by any other region than the discrimination region 2a, and intercepts regularly reflected light-beam from the wafer when a dark-field light source (mentioned later) is turned on.

Figure 5:
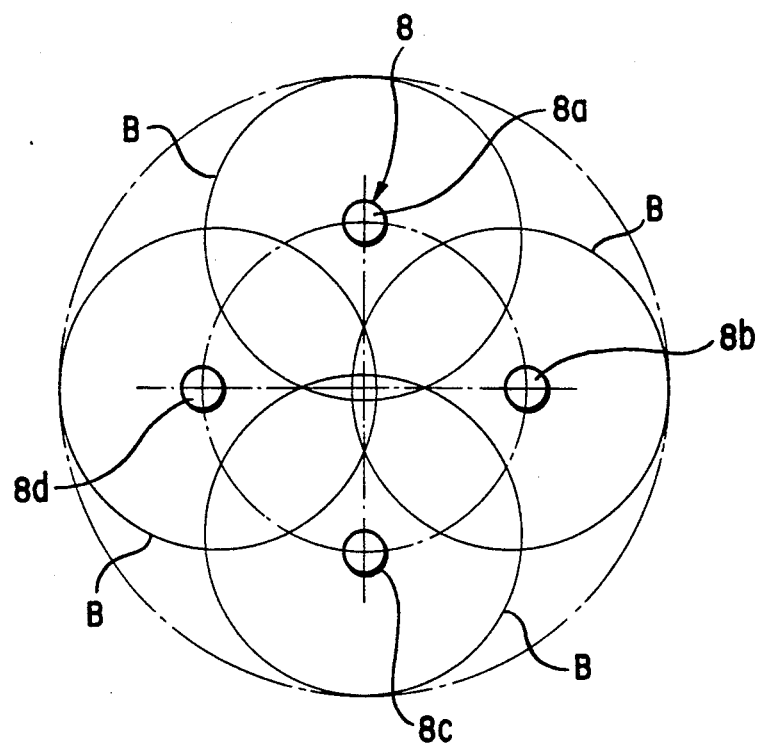
FIG. 5 is a diagram showing irradiation patterns produced by the light source.
Figure 6:
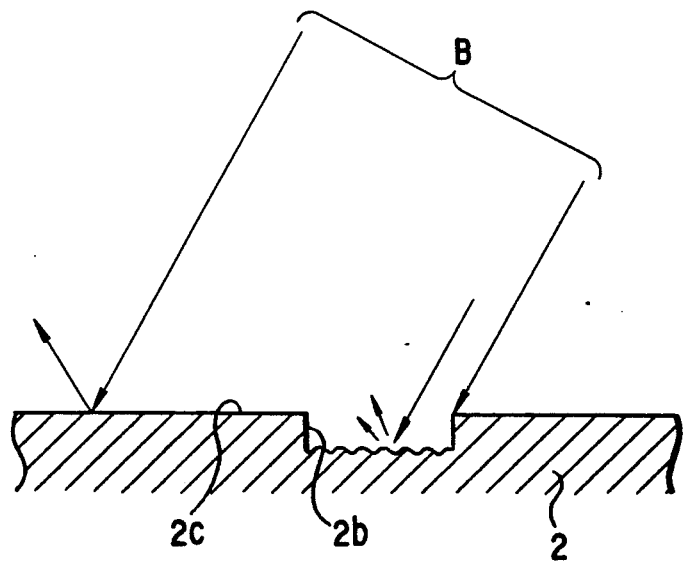
FIG. 6 is a diagram illustrating the way irradiation light beams are incident upon and reflected from a wafer during a dark field measurement.

As shown in FIG. 4, the light source assembly 1 includes the dark-field light source which is composed of first and second illuminant groups 8 and 9. The first illuminant group 8 includes four light emitting diodes 8a to 8d which are arranged at intervals of 90° on the circumference of a circle around the optical axis A. The second illuminant group 9 includes four light emitting diodes 9a to 9d arranged at angular distances of 45° from the diodes 8a to 8d of the first group 8, respectively. The first and second illuminant groups 8, 9 can be selectively turned on, independently. Thus, light beams of different intensities are emitted in a ring around the optical axis A from the light source assembly 1 when one or both of the first and second illuminant groups 8 and 9 are turned on, depending on the configuration of the discrimination region 2a. In observing the discrimination region 2a together with lattice patterns formed in the vicinity thereof, for example, it is advisable to apply the light beams substantially from the whole circumference of these patterns and the discrimination region, so that both the illuminant groups 8 and 9 are turned on. If the patterns need not be observed, the light beams must be applied from four directions, so that one of the illuminant groups is turned on. The individual light emitting diodes 8a to 8d and 9a to 9d of the first and second illuminant groups 8 and 9 emit the light beams in the following manner. The light beams emitted from the diodes 8a to 8d of the first illuminant group 8, for example, are refracted in parallel relation toward the central portion of the discrimination region 2a by the condensing lens 4, and are applied to the surface of the wafer to form spots thereon, as shown in FIGS. 5 and 6. Thus, the light beams are uniformly applied to the whole area of the discrimination region 2a with spot portions B of the light beams from the individual light emitting diodes 8a to 8d overlapping one another.

In the light source assembly 1, as shown in FIGS. 2 to 4, a light-field light source or a single light emitting diode 13 for applying a light beam to the discrimination region 2a at right angles thereto is disposed in the central portion of the illuminant ring, that is, on the optical axis A. The light-field diode 13 or the dark-field illuminant ring (i.e., first and second illuminant groups 8 and 9) can be alternatively turned on. The alternative activation of the light source can be effected by alternatively turning on each corresponding power source by means of a switch 101. Thus, a light- or dark-field measurement can be selectively conducted depending on the configuration of the discrimination region 2a. The light emitting diodes may be ones well-known in the art, which emit red light with a wavelength of about 660 nm, or ones which emit light with a different wavelength, e.g., as short as 550 to 570 nm.

Preferably, a diffusion plate 13a is disposed in front of the light-field light emitting diode 13, as indicated by broken lines in FIG. 3, whereby the irregularity in luminous intensity of the light incident upon the wafer is reduced. Since the light beams from the dark-field light sources 8 and 9 are expected to be incident with as high intensities as possible, it is advisable to use no diffusion plate in this case.

The condensing lens 4 for illumination, which has a focal length of, e.g., 100 mm, condenses the illumination light from the light source assembly 1 on the wafer surface, and focuses reflected light from the wafer on the position of the diaphragm 7. In this case, regularly reflected versions of the light beams from the dark-field illuminant groups 8 and 9 are focused on and intercepted by the surface of the diaphragm 7, and some of irregularly reflected light beams pass the center opening 7a.

The objective lens 5 for detection is selected out of lenses with various lengths, e.g., 40 mm, 60 mm, and 80 mm, which can be replaced with one another as required.

The CCD camera 6 is connected to an image processing device 102 so that image data picked up by means of the camera 6 is processed by the device 102, whereby the discrimination region 2a is read.

The light source assembly 1 need not always be composed of a plurality of illuminants as aforesaid. As shown in FIG. 7, for example, it may alternatively be designed so that a light transmitting plate 12, having a shield section 11 in its central portion and a ring-shaped light transmitting section 12a defined in the peripheral portion thereof, is provided on the irradiation side of a single illuminant 10. The light transmitting section need not always be in the form of a continuous ring, and may alternatively be formed of, for example, a plurality of light transmitting portions arranged at equal distances from the optical axis.

Figure 8:
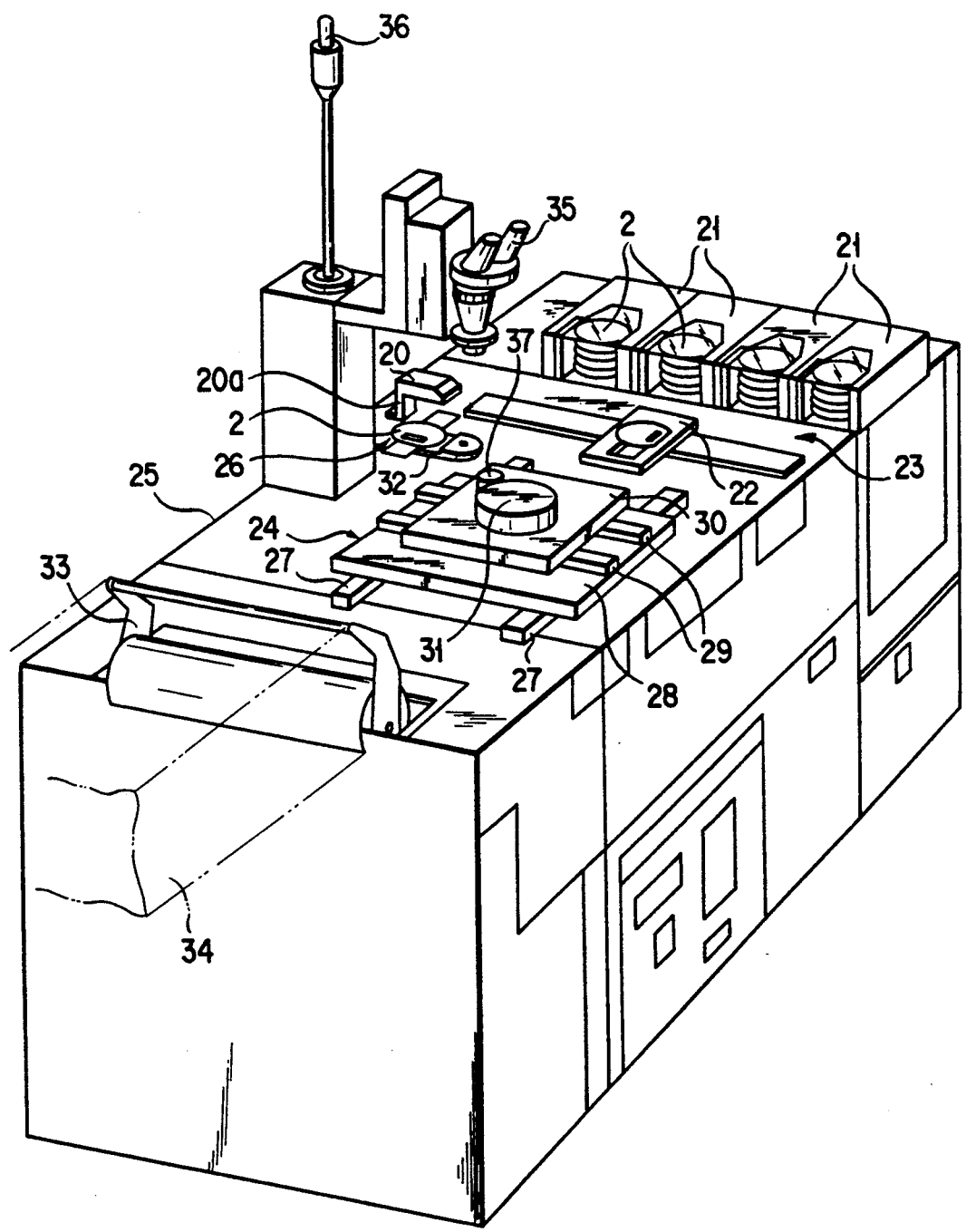

The symbol/character discrimination apparatus of the present invention, constructed in this manner, is incorporated in a wafer transportation section of a probe apparatus, as shown in FIGS. 8 and 9, when it is used.

In this probe apparatus, the discrimination apparatus 20 of the present invention is located above the wafer transportation section or pre-alignment section 26 by means of a bracket 20a so as to be movable in X, Y, and Z directions. The pre-alignment section 26 is formed between a loader section 23 and an inspection section 25. The loader section 23 includes a wafer transportation mechanism 22 which holds and transports a plurality of wafers 2 in a wafer cassette 21 one after another. The inspection section 25 is provided with wafer holding means 24 which carries each wafer 2 thereon and movable in the horizontal and vertical directions. Since symbols and/or characters on each wafer 2 can be discriminated by means of the apparatus 20 before and after a wafer inspection process, the conformance of an electrode pad can be determined corresponding to each wafer 2, and the reliability of inspection can be improved. Focusing can be effected by moving the apparatus 20 in the Z direction, and a measurement for a wide discrimination region can be made by moving the apparatus 20 in the X and/or Y direction.

The wafer holding means 24 comprises a Y-stage 28 slidably mounted on Y-direction guide rails 27, an X-stage 30 slidably mounted on X-direction guide rails 29, which are arranged on the Y-stage 28 and extend at right angles to the Y-direction, and a chuck 31 mounted on the top portion of the X-stage 30 for up-and-down motion and horizontal rotation. A probe polisher 37 for removing fine dust (e.g., shavings of aluminum oxide film on the surface of the electrode pad) adhering to a probe during inspection is attached to the lateral face of the chuck 31. Further, the pre-alignment section 26 is provided with a pre-alignment stage 32, which is used to transfer the wafer 2 between the wafer transportation mechanism 22 of the loader section 23 and the chuck 31 of the wafer holding means 24.

A test head 34 is attached to the top portion of the inspection section 25 so that it can be raised up and brought down by means of a test head loading mechanism 34. The probe or probes of a probe card (not shown) to be connected to the test head 34 is brought into contact with the electrode pad or pards of the wafer 2 on the chuck 31, which is moved to the region under the probe card, whereby the electrical properties of the wafer 2 are measured. In FIG. 8, numerals 35 and 36 denote a microscope and a probe apparatus operation indicator lamp, respectively.

In the discrimination apparatus 20 incorporated in the probe apparatus in the manner described above, as shown in FIG. 10, the half-mirror 3 is disposed in the central portion of a horizontally elongated casing 16, and the condensing lens 4 is located on the left of the mirror 3. Also, a reflector 14 is arranged to guide the light beam transmitted through the lens 4 to the discrimination region on the wafer 2 below, and the CCD camera 6 is located on the right of the mirror 3 with the diaphragm 7 and the objective lens 5 between them. Since the light source assembly 1 can be housed in a light source chamber 17, which is situated under the half-mirror 3, the whole discrimination apparatus can be reduced in size, the application of the light beams from the assembly 1 to the wafer surface and the guidance of the reflected light beams from the wafer surface to the camera 6 can be efficiently performed in a small space. Thus, the discrimination apparatus can be easily incorporated in the wafer transportation section of the probe apparatus. In the symbol/character discrimination apparatus constructed in this manner, although the image data picked up by means of the CCD camera 6 is identified as a reversed image, it can be converted into a normal image by means of an image reversal mechanism (not shown).

Figure 10:
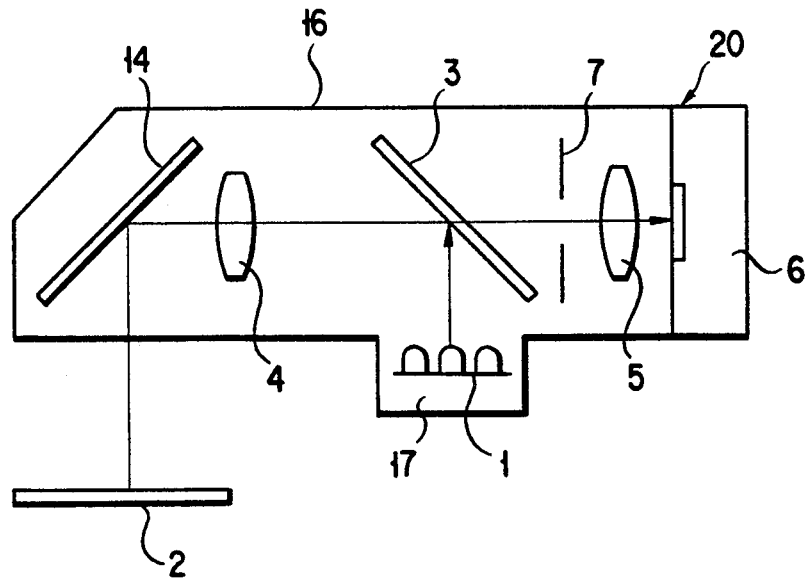
FIG. 10 shows a specific configuration of the symbol/character discrimination apparatus of the invention.
Figure 11:
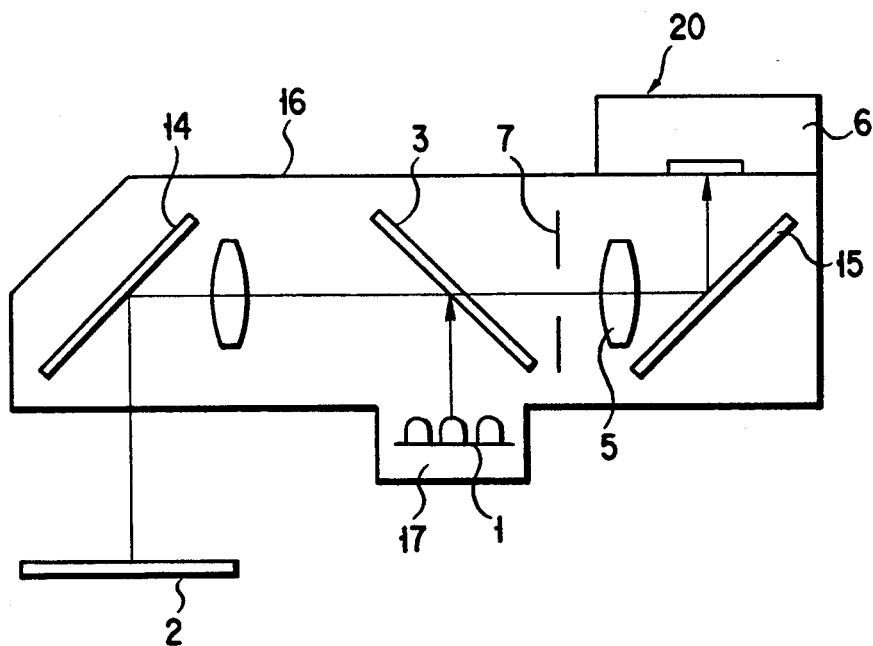
FIG. 11 is a sectional view showing an alternative configuration of the symbol/character discrimination apparatus of the invention.

An alternative version of the discrimination apparatus shown in FIG. 11 is designed so that a normal image can be identified by means of the CCD camera 6, and differs from the apparatus shown in FIG. 10 in that a second reflector 15 is disposed between the objective lens 5 and the camera 6.

The following is a description of the operation of the symbol/character discrimination apparatus according to the present invention.

If a groove 2b cut in the discrimination region 2a has a depth of 1 to 2 $\mu$m, the first illuminant group 8 of the light source assembly 1 is turned on or activated to emit light beams. These light beams are reflected at 90° by the half-mirror 3, and are condensed at a predetermined angle of incidence on the discrimination region 2a by means of the condensing lens 4. Those light beams which are applied to the groove 2b of the region 2a are irregularly reflected, while the ones applied to other portions of the region 2a are regularly reflected. Al these reflected light beams are transmitted through the condensing lens 4 and the half-mirror 3, and are then condensed on the diaphragm 7 by means of the lens 4. In doing this, the regularly reflected light beams are intercepted by the diaphragm 7, and some of the irregularly reflected light beams pass through the center opening 7a of the diaphragm 7. The passed light beams are focused on an input surface of the CCD camera 6, and picked up in a dark field by the camera 6. The image data picked up by means of the camera 6 is delivered to the image processing device 102, whereupon it is processed so that an identification pattern on the discrimination region 2a is discriminated.

If the symbols and/or characters on the discrimination region 2a are formed of characters, a dark-field measurement can be conducted such that symbol/character portions can be definitely discriminated from other portions, by simultaneously turning on the first and second illuminant groups 8 and 9 to discriminate the discrimination region 2a in the same manner as aforesaid.

If the symbol/character groove 2b in the discrimination region 2a is as deep as several micrometers to more than ten micrometers, the light field illuminant 13 is turned on so that a light beam from the light source 13 is incident upon the wafer surface at right angles thereto, and a regularly reflected light beam from the wafer surface is received by means of the CCD camera 6. Thus, a light-field measurement is conducted such that the area corresponding to the groove 2b can be recognized as a dark image contrasted by a light picture.

Although the discrimination of the symbols and/or characters formed on the wafer 2 in the probe apparatus has been described in connection with the above embodiment, the discrimination apparatus of the present invention is not limited to use in the probe apparatus, and may be also used singly as a symbol/character discrimination apparatus. Besides, it may be applied to any optical information reading mechanisms, such as alignment mechanisms for a CVD apparatus, sputtering apparatus, etc.

Arranged in this manner, the symbol/character discrimination apparatus according to the present invention provides the following effects.

Since the light beams are uniformly applied to the discrimination region, symbols and/or characters can be definitely discriminated. Since the optical systems, including the condensing lens, objective lens (objective optical means), etc., are arranged on the same optical axis, moreover, the apparatus can enjoy a simple, compact structure, thus facilitating effective utilization of space.

Since the light emitting mode of the light source means can be selected depending on the states of the symbols and/or characters to be discriminated, furthermore, the discrimination can be effected under optimum conditions, and energy can be saved.

Since the light- or dark-field measurement can be alternatively conducted, moreover, the apparatus of the present invention can enjoy a wider range of application for multipurpose use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A symbol discrimination apparatus, comprising:
   image sensing means for detecting light reflected off of a surface of a sample on which symbols are formed in an indentation pattern;
   an objective optical means;
   a diaphragm means;
   a beam splitter;
   a condensing lens; and
   dark-field light source means, for emitting light beams towards said beam splitter;
   said beam splitter, disposed between said diaphragm means and said condensing lens for reflecting the emitted light beams from said dark-field light source means towards said condensing lens and said sample such that said reflected light beams are applied to the surface of the sample at predetermined angles of incidence, and for guiding regularly reflected and irregularly reflected light beams from the surface of the sample towards the diaphragm means;
   said condensing lens, disposed between said beam splitter and the sample, for condensing the reflected light beams from the beam splitter onto the surface of the sample and for guiding the regularly and irregularly reflected light beams reflected off of the sample through the beam splitter towards said diaphragm means;
   said diaphragm means disposed between said beam splitter and said objective lens, for intercepting the regularly reflected light beams among the reflected light beams from the sample, and for allowing at least some of the irregularly reflected light beams to pass towards said objective optical means;
   said objective optical means disposed between the image sensing means and the diaphragm means, for guiding said at least some of the irregularly reflected light beams to the image sensing means;
   the condensing lens, the diaphragm means, and the objective optical means having a common optical axis.

2. An apparatus according to claim 1, wherein said diaphragm means includes a diaphragm plate located substantially in a focus position of the condensing lens and having an opening through which the optical axis passes.

3. An apparatus according to claim 1, wherein said light source means includes a plurality of light sources projecting light beams which are reflected off of said beam splitter at equal distances from the optical axis.

4. An apparatus according to claim 3, wherein said plurality of light sources are disposed on one side of the beam splitter.

5. An apparatus according to claim 4, wherein said plurality of light sources are arranged such that the light beams reflected off of the beam splitter are arranged at equal angular intervals around the optical axis.

6. An apparatus according to claim 1, wherein said light source means includes:
   a single light source for projecting a light beam which is reflected off of the beam splitter onto the optical axis towards the condensing lens; and
   means for restricting the light beam from the light source to an annular beam.

7. A symbol discrimination apparatus, comprising:
   image sensing means for detecting light reflected off of a surface of a sample on which symbols are formed in an indentation pattern;
   an objective optical means;
   a diaphragm means;
   a beam splitter;
   a condensing lens; and
   dark-field light source means, for emitting light beams toward said beam splitter;
   the condensing lens, the diaphragm means, and the objective optical means having a common optical axis;
   said beam splitter, disposed between said diaphragm means and said condensing lens for reflecting the emitted light beams from said dark-field light source means towards said condensing lens and said sample such that said light beams reflected off said beam splitter are applied to the surface of the sample at predetermined angles of incidence, and four light beams from the first light sources are reflected off of said beam splitter at equal distances from said optical axis and arranged at angular intervals of 90° around said optical axis, and for guiding regularly reflected and irregularly reflected light beams from the surface of the sample towards the diaphragm means;
   said condensing lens, disposed between said beam splitter and the sample, for condensing the reflected light beams from the beam splitter onto the surface of the sample and for guiding the regularly and irregularly reflected light beams reflected off of the sample through the beam splitter towards said diaphragm means;
   said diaphragm means disposed between said beam splitter and said objective lens, for intercepting the regularly reflected light beams among the reflected light beams from the sample, and for allowing at least some of the irregularly reflected light beams to pass towards said objective optical means;
   said objective optical means disposed between the image sensing means and the diaphragm means, for guiding said at least some of the irregularly reflected light beams to the image sensing means.

8. An apparatus according to claim 7, wherein said plurality of light source include second light sources for emitting second light beams to the beam splitter and the beam splitter reflected the second light beams at angular intervals of 90° around the optical axis and at angular intervals of 45° from the first light beams corresponding thereto, and which further comprises drive means for selectively driving the first light source, the second light source, or both of the first and second light sources.

9. A symbol discrimination apparatus, comprising:
   image sensing means for detecting light reflected off of a surface of a sample on which symbols are formed in an indentation pattern;
   an objective optical means;
   a diaphragm means;
   a beam splitter;
   a condensing lens;
   dark-field light source means, for emitting dark field light beams towards said beam splitter; and
   light-field light source means for emitting a light-field light beam towards said beam splitter;
   the condensing lens, the diaphragm means, and the objective optical means having a common optical axis;
   said beam splitter, disposed between said diaphragm means and said condensing lens for reflecting the dark-field light beams from said dark-field light source means towards said condensing lens and said sample such that said reflected dark-field light beams are applied to the surface of the sample at predetermined angles of incidence, and for reflecting the light-field light beam from said light-field light source means through said condensing lens to the sample surface at right angles thereto, and for guiding regularly reflected and irregularly reflected light beams from the surface of the sample towards the diaphragm means;
   said condensing lens, disposed between said beam splitter and the sample, for condensing the reflected light beams from said beam splitter onto the surface of the sample and for guiding the regularly and irregularly reflected light beams reflected off of the sample through said beam splitter towards said diaphragm means;
   said diaphragm means disposed between said beam splitter and said objective lens, for intercepting the regularly reflected dark-field light beams among the reflected light beams from the sample, and for allowing at least some of the irregularly reflected dark-field light beams and regularly reflected light-field light beams from the sample to pass towards said objective optical means;
   said objective optical means disposed between the image sensing means and the diaphragm means, for guiding said at least some of the irregularly reflected light beams and said regularly reflected light-field light beams to the image sensing means.

10. An apparatus according to claim 9, wherein said dark-field light source means includes a plurality of light sources arranged to reflect said dark-field light beams off of said beam splitter at equal distances from the optical axis, and said light-field light source means includes one light source arranged to reflect said light-field light beam off of said beam splitter onto the optical axis.

11. An apparatus according to claim 10, wherein said plurality of light sources of the dark-field light source means and said one light source on the light-field light source means are disposed on one side of the beam splitter.

* * * * *